US008572055B1

(12) United States Patent
Wu et al.

(10) Patent No.: US 8,572,055 B1
(45) Date of Patent: Oct. 29, 2013

(54) METHOD AND SYSTEM FOR EFFICIENTLY HANDLING SMALL FILES IN A SINGLE INSTANCE STORAGE DATA STORE

(75) Inventors: Weibao Wu, Vadnais Heights, MN (US); Michael John Zeis, Minneapolis, MN (US)

(73) Assignee: Symantec Operating Corporation, Mountain View, CA (US)

( * ) Notice: Subject to any disclaimer, the term of this patent is extended or adjusted under 35 U.S.C. 154(b) by 968 days.

(21) Appl. No.: 12/164,284

(22) Filed: Jun. 30, 2008

(51) Int. Cl.
*G06F 7/00* (2006.01)
*G06F 17/00* (2006.01)

(52) U.S. Cl.
USPC .......................... 707/697; 707/698; 711/216

(58) Field of Classification Search
None
See application file for complete search history.

(56) References Cited

U.S. PATENT DOCUMENTS

| | | | |
|---|---|---|---|
| 5,813,008 A | 9/1998 | Benson et al. ........................ 1/1 |
| 7,478,113 B1* | 1/2009 | De Spiegeleer et al. ............... 1/1 |
| 7,814,078 B1* | 10/2010 | Forman et al. ................. 707/698 |
| 2008/0098083 A1* | 4/2008 | Shergill et al. ................. 709/217 |
| 2008/0133561 A1* | 6/2008 | Dubnicki et al. ............. 707/101 |
| 2008/0144079 A1* | 6/2008 | Pandey et al. ................ 358/1.15 |
| 2008/0235163 A1* | 9/2008 | Balasubramanian et al. .. 706/12 |
| 2008/0243953 A1* | 10/2008 | Wu et al. ........................ 707/204 |
| 2008/0244204 A1* | 10/2008 | Cremelie et al. .............. 711/162 |
| 2008/0256143 A1* | 10/2008 | Reddy et al. ................... 707/204 |
| 2009/0204649 A1* | 8/2009 | Wong et al. .................... 707/204 |
| 2009/0204650 A1* | 8/2009 | Wong et al. .................... 707/204 |
| 2009/0276454 A1* | 11/2009 | Smith ............................ 707/102 |

* cited by examiner

Primary Examiner — Angelica Ruiz
(74) Attorney, Agent, or Firm — Campbell Stephenson LLP

(57) ABSTRACT

A method, system and apparatus for efficient storage of small files in a segment-based deduplication scheme by allocating multiple small files to a single data segment is provided. A mechanism for distinguishing between large files (e.g., files that are on the order of the size of a segment or larger) and smaller files, and starting a new segment at the beginning of a large file is also provided. A file attribute-based system for determining an identity of a small file at which to begin a new segment and then allocating subsequent small files to that segment and contiguous segments until a next small file having an appropriate attribute subsequently is encountered to begin a new segment is further provided. In one aspect of the present invention a filename hash is used for file attribute analysis to determine when a new segment should begin. Using such a mechanism, multiple small files can be allocated to a data segment and at the same time continue to provide for efficient storage of large files within separate data segments. The file attribute analysis further provides for an increase in deduplication rate for subsequently provided copies of the small files (e.g., in a backup) since segment boundaries remain constant in spite of file additions or deletions.

18 Claims, 9 Drawing Sheets

```
\client1\directory1 \file0         f₀
             \file1                f₁
             \file2                f₂
             \subdir1  \file3      f₃
                       \file4      f₄
             \subdir2  \file5      f₅
\directory2\file6                  f₆
            \file7                 f₇
            \subdir1  \file8       f₈
                      \file9       f₉
```
Figure 5A
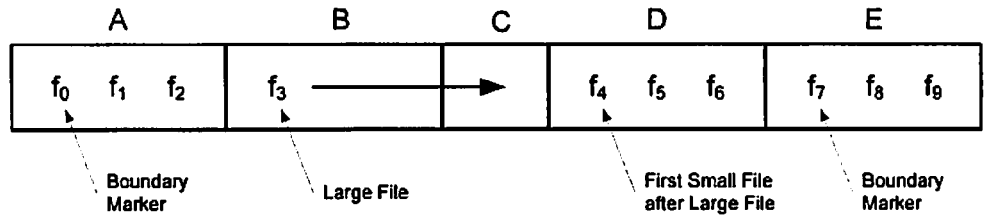
Figure 5B
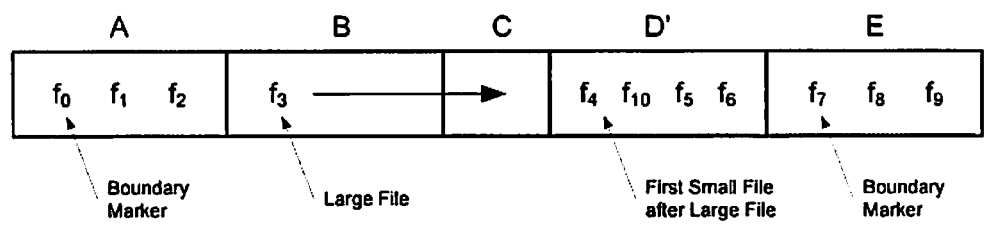
Figure 5C

METHOD AND SYSTEM FOR EFFICIENTLY HANDLING SMALL FILES IN A SINGLE INSTANCE STORAGE DATA STORE

FIELD OF THE INVENTION

The present invention relates to the field of data storage, and particularly to providing for storage of multiple small files per data segment in a single instance storage data store.

BACKGROUND OF THE INVENTION

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a piece of information only one time. Thus, in a backup scenario, if a piece of information is stored in multiple locations within an enterprise, that piece of information will only be stored one time in a deduplicated backup storage area. Or if the piece of information does not change between a first backup and a second backup, then that piece of information will not be stored during the second backup as long as that piece of information continues to be stored in the deduplicated backup storage area. Data deduplication can also be employed outside of the backup context thereby reducing the amount of active storage occupied by duplicated files.

In order to provide for effective data deduplication, data is divided in a manner that provides a reasonable likelihood of finding duplicated instances of the data. For example, data can be examined on a file-by-file basis, and thus duplicated files (e.g., operating system files and application files and the like) would be analyzed and if the entire file had a duplicate version previously stored, then deduplication would not occur. A drawback of a file-by-file deduplication is that if a small section of a file is modified, then a new version of the entire file would be stored, including a potentially large amount of data that remains the same between file versions. A more efficient method of dividing and analyzing data, therefore, is to divide file data into consistently-sized segments and to analyze those segments for duplication in the deduplicated data store. Thus, if only a portion of a large file is modified, then only the segment of data corresponding to that portion of the file need be stored in the deduplicated data storage and the remainder of the segments will not be duplicated.

A drawback of such a segment-based deduplication scheme is that there may be a significant number of files that are smaller than a chosen data segment size. In such a scenario, if each file begins at the beginning of a segment, there may be significant unused storage space in segments containing files smaller than the segment size. In addition, there can be overhead and management issues associated with a large number of segments each containing only one file. Or, if segments are made the same size as a file, there still can be overhead and management issues with a large number of segments. It is therefore desirable to have a mechanism that provides for efficient use of data storage in a segment-based deduplication scheme that takes into consideration the presence of files that are smaller than a chosen data segment size. It is further desirable that such a mechanism for addressing issues presented by smaller files also provide for a reduction in management of file metadata associated with files being stored in a deduplicated storage area.

SUMMARY OF THE INVENTION

A method, system and apparatus for efficient storage of small files in a segment-based deduplication scheme by allocating multiple small files to a single data segment is provided. Aspects of the present invention distinguish between large files (e.g., files that are on the order of the size of a segment or larger) and smaller files, and starting a new segment at the beginning of a large file. Further aspects of the present invention use a file attribute-based system for determining an identity of a small file at which to begin a new segment and then allocating subsequent small files to that segment and contiguous segments until a next small file having an appropriate attribute subsequently is encountered at which point that file will be allocated to begin a new segment. In one aspect of the present invention a filename hash is used for file attribute analysis to determine when a new segment should begin. Using such a mechanism, multiple small files can be allocated to a data segment and at the same time continue to provide for efficient storage of large files within separate data segments. A further advantage of using a file attribute analysis to determine segment boundaries is an increase in deduplication rate for subsequently provided copies of the small files (e.g., in a backup) since segment boundaries remain constant in spite of file additions or deletions.

In one embodiment of the present invention, a first file is assigned to one of a first or second data segment and the first and second data segments are provided to a single instance storage volume. The assigning of the first file to the data segments is performed by generating a hashed file identifier of first file, then assigning the first file to the first data segment if the hashed file identifier is not equal to a predetermined boundary value, and assigning the first file to begin the second data segment if the hashed file identifier does equal the predetermined boundary value.

In one aspect of the above embodiment, a segment fingerprint of the first data segment is generated using a checksum of the first data segment, the segment fingerprint is associated with the first data segment, and the first data segment is stored in the single instance storage volume with the segment fingerprint. The storing is performed if a data segment previously stored in the single instance storage volume is not associated with a fingerprint that matches the segment fingerprint associated with the first data segment.

BRIEF DESCRIPTION OF THE DRAWINGS

The present invention may be better understood, and its numerous objects, features and advantages made apparent to those skilled in the art by referencing the accompanying drawings.

FIG. 5A is an illustration of a simple directory structure.

FIG. 5B is a simplified block diagram illustrating a division of files from FIG. 5A among a set of data segments, in accord with embodiments of the present invention.

FIG. 5C illustrates the effect of adding a file to the directory structure of FIG. 5A, in accord with embodiments of the present invention.

DETAILED DESCRIPTION

Embodiments of the present invention provide for efficient storage of small files in a segment-based deduplication scheme by allocating multiple small files to a single data segment. Embodiments of the present invention distinguish between large files (e.g., files that are on the order of the size of a segment or larger) and smaller files, and starting a new segment at the beginning of a large file. Embodiments of the present invention further use a file attribute-based system for determining an identity of a small file at which to begin a new segment and then allocating subsequent small files to that segment and contiguous segments until a next small file having an appropriate attribute subsequently is encountered at which point that file will be allocated to begin a new segment. Embodiments of the present invention use a filename hash as the file attribute analysis in order to determine when a new segment should begin. Using such a mechanism, multiple small files can be allocated to a data segment and at the same time continue to provide for efficient storage of large files within separate data segments.

The general concept behind data deduplication is to reduce an amount of storage needed for enterprise data by eliminating duplicated data content. One embodiment of a deduplicated data storage area is a single instance storage. In a single instance storage volume, only a single instance of a piece of data is stored. A common use of a single instance storage is in maintaining data backups for servers and other computing clients in a network. For each backup, only a single instance of information duplicated in the network will be stored in the single instance storage area. In addition, for subsequent backups occurring over time, data items that have not changed from one backup to another need not be stored in the subsequent backup. In this manner, significant savings in data storage space can be realized.

As an example of data deduplication in a backup environment, an initial full backup of a file server can be performed in which the data included in the backup is divided and identified in a manner as discussed below. Subsequent daily backups of the file system involve identifying new or changed segments of data using the same data identification system as performed with the full backup and then storing only the new or changed data in the single instance storage area. Depending upon the number of new or changed files in the file system, a reduction in the size of the backup subsequent to the initial full backup can be as much as 99%. The single instance storage approach to backups allows for very small daily backups with an ability to recover a full image from any backup on any day. The traditional distinction between a "full" backup and an "incremental" backup disappears since, although only new or changed data is saved in the single instance storage area, all the data that is backed up can be restored at any time using a single backup restore.

Figure 1:
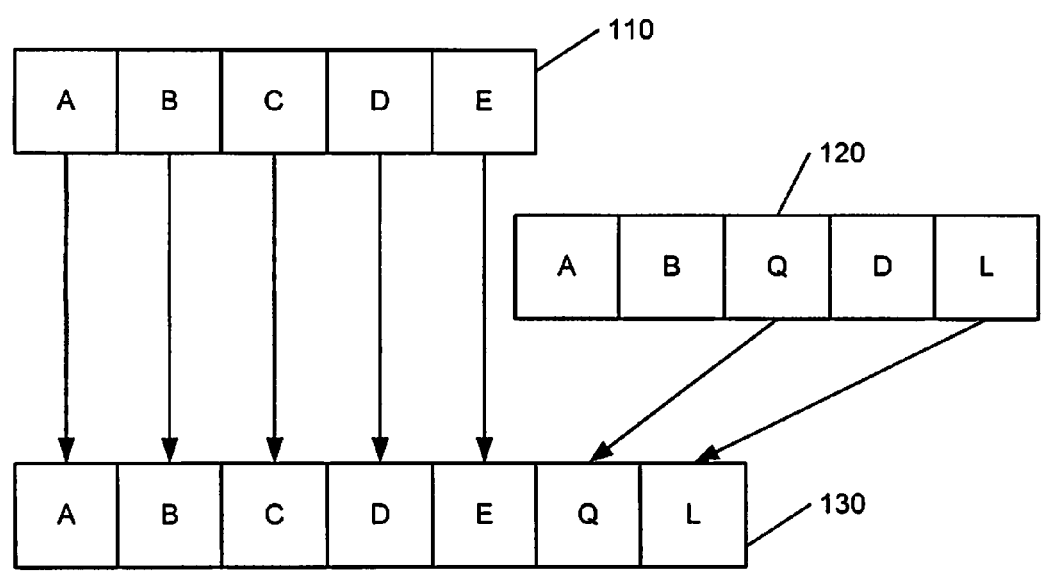
FIG. 1 is a simplified block diagram illustrating a method of data deduplication compatible with embodiments of the present invention.

FIG. 1 is a simplified block diagram illustrating a method of data deduplication. Files 110 and 120 share identical content, but the files themselves are not completely identical. Each file is broken into segments: A, B, C, D, E for file 110 and A, B, Q, D, L for file 120. The data deduplication system will write file segments A, B, C, D, E, Q and L into the single instance storage area (130) and will not write file segments A, B and D from file 120 into the single instance storage area. Thus, if two data segments are the same, one can save space in a single instance storage area by only storing one copy of the segment and providing two pointers (e.g., one corresponding to file 110 and the other to file 120) to that segment. As will be discussed in more detail below, in order to track a location of data for a file, metadata containing, for example, pointers to the data of a file can be stored in a metadata storage area.

Figure 2:
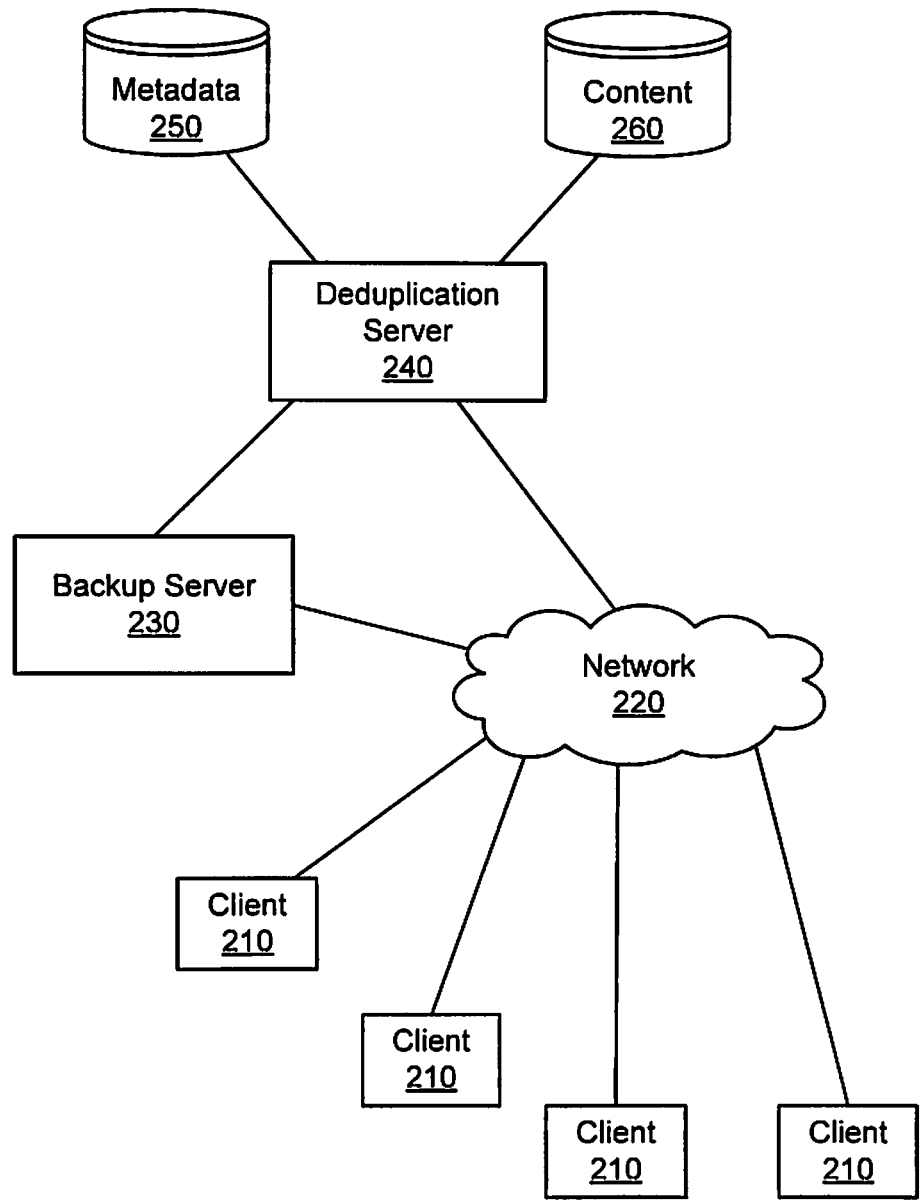
FIG. 2 is a simplified block diagram of a network incorporating a deduplication system usable with embodiments of the present invention.

FIG. 2 is a simplified block diagram of a network incorporating a deduplication system usable with embodiments of the present invention. Client computers 210 are coupled to a network 220. Each client computer has access to one or more file systems that are stored in either storage volumes directly-coupled to each of the clients or by storage volumes that are served to the client computers by a storage area network (SAN), network attached storage (NAS), storage appliance and the like (not shown). Client computers can include, for example, servers and desktop nodes. Embodiments of network 220 can include, for example, a local area network, metro area network, wide area network, or any combination thereof.

Backup server 230 is also coupled to network 220. Backup server 230 is configured to, for example, manage administrative tasks related to backing up clients 210. Such tasks include communicating with clients 210 to initiate backup tasks on the clients, maintaining databases related to files and other information backed up from file systems associated with the clients, and managing or tracking resources storing backups of clients 210. In the system illustrated in FIG. 2, backup server 230 is further configured to communicate with deduplication server 240 for purposes of storing backups of client 210 in resources controlled by deduplication server 240. Such communication can be via network 220 or via a direct link between the backup server and the deduplication server.

Deduplication server 240 is coupled to network 220 and performs a variety of tasks related to management and implementation of deduplication services for the system illustrated in FIG. 2. Deduplication server 240 can include one or more physical servers configured to perform a variety of tasks related to deduplication. Deduplication server 240 is in turn coupled to a storage pool for deduplicated data that includes one or more metadata volumes 250 and one or more content volumes 260.

Figure 3:
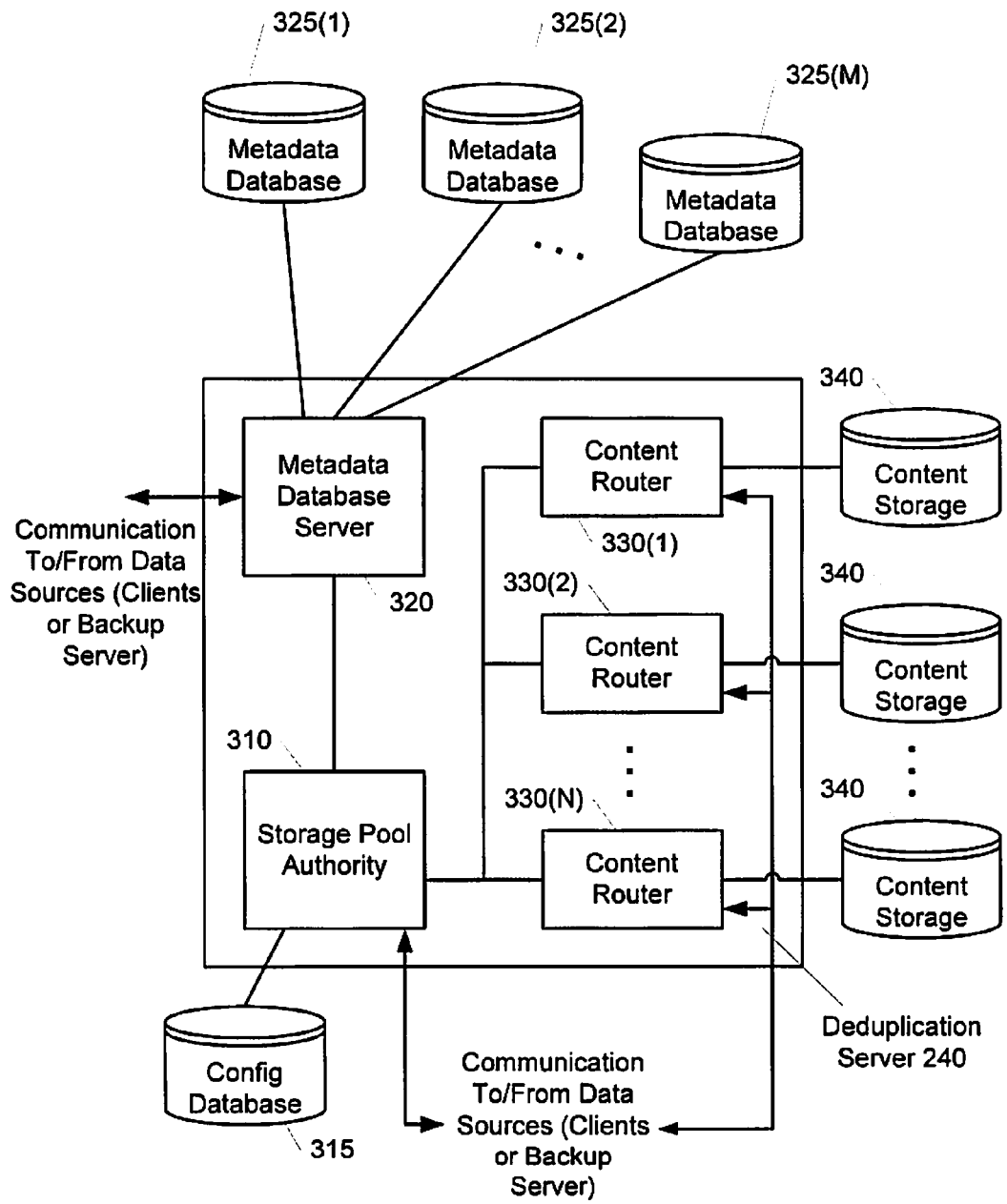
FIG. 3 is a simplified block diagram illustrating components of deduplication server usable with embodiments of the present invention.

FIG. 3 is a simplified block diagram illustrating components of deduplication server 240. Storage pool authority module 310 performs administration tasks related to management of the storage pool resources. Among such administrative tasks include setting policies for storage resources, such as retention times for data stored, types of metadata associated with stored data that is required, size of data segments, and the like. Storage pool authority module 310 can also perform scheduling-related tasks, management of concurrently arriving data streams, and management of data being provided to content storage (e.g., locations for storing various incoming data). Storage pool authority module 310 can store configuration information for the storage pool in a configuration database 315.

Deduplication server 240 also includes a metadata database server module 320 that communicates with storage pool authority 310 or with data sources (e.g., clients 210 or backup server 230). Metadata database server module 320 is configured to distribute metadata received from storage pool authority 310 or the data sources to one or more metadata database engines 325(1)-(M). Such metadata includes information about the nature of the data stored by the storage pool. The metadata stored by metadata database engines 325(1)-(M) will be discussed in greater detail below.

Deduplication server 240 also includes one or more content routers 330(1)-(N) that are communicatively coupled to storage pool authority 310 and to data sources (e.g., clients 210 or backup server 230). The content routers are configured to receive data content being stored in the storage pool managed by deduplication server 240 and to manage the storage of that data in one or more content storage volumes 340. Storage pool authority module 310 can be configured to distribute data in a fair and efficient manner across all content routers 330(1)-(N).

It should be recognized that modules 310, 320 and 330 can be executed by one or more physical servers configured to perform the functionality required by the various modules.

Figure 4A:
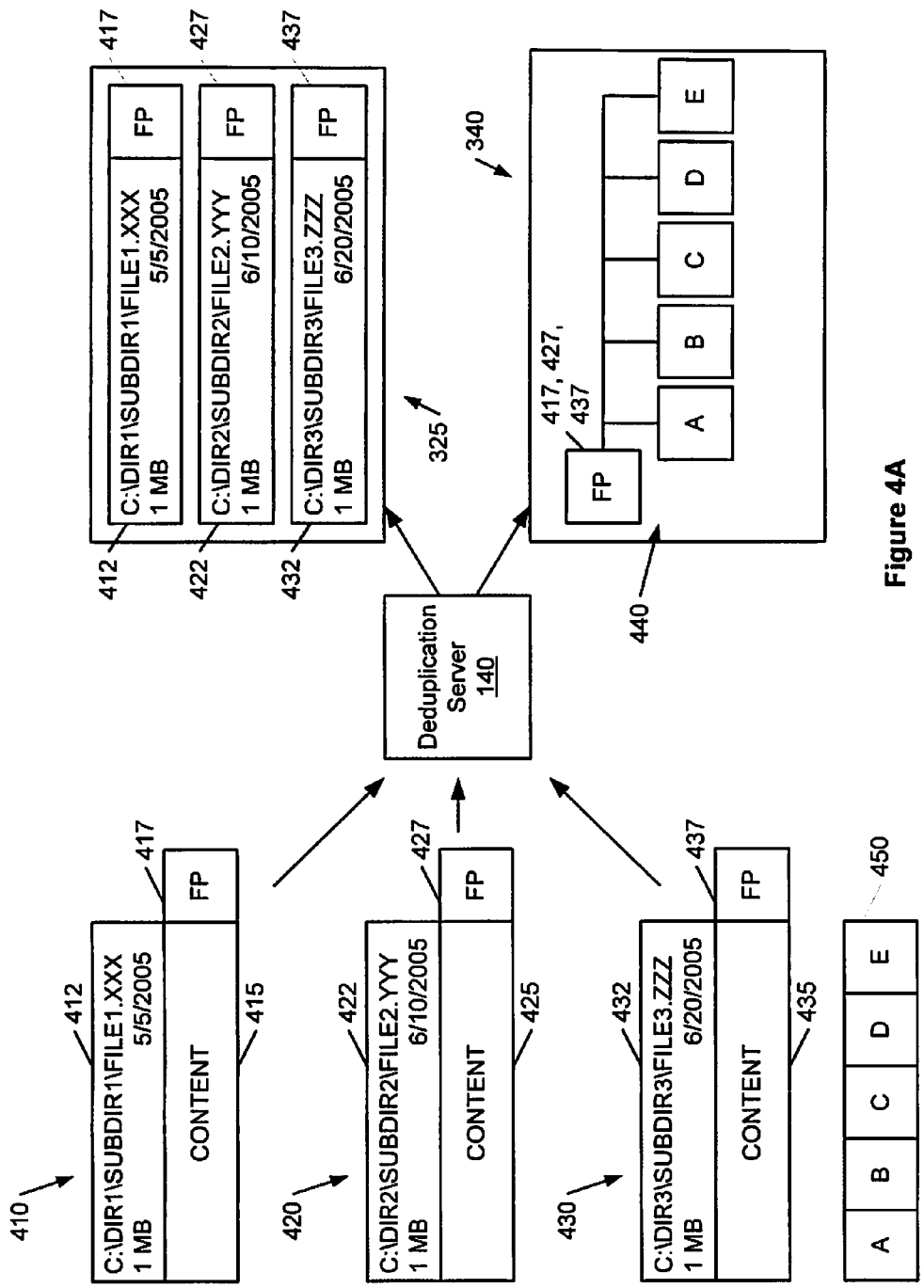
FIG. 4A is a simplified block diagram illustrating an example of information stored by the metadata database engines and the content routers of a deduplication system capable of implementing embodiments of the present invention.

FIG. 4A is a simplified block diagram illustrating an example of information stored by the metadata database engines and the content routers of a deduplication system capable of implementing embodiments of the present invention. FIG. 4A illustrates client files 410, 420 and 430, each of which contains identical content. Files 410, 420 and 430 can be located on the same client or on different clients. Each file is associated with metadata that describes the file (412, 422, 432), including, for example, the filename, size of the file, and a modification date. Each file also contains data content associated with the file (415, 425, 435). Identity of the content of the files is established by a fingerprint generated using the content of each file (417, 427, 437). The fingerprint of the file content is generated, for example, using a hash or checksum process sufficient to uniquely identify the file content.

A deduplication process can proceed in the following manner. If, for example, file 410, 420 and 430 are being backed up, file 410 is provided to deduplication server 140. Metadata 412 associated with file 410 is provided to a metadata database engine 325 along with the associated fingerprint 417. Content 415 of file 410 is divided into a set of segments A, B, C, D and E (450) and these segments are provided to a content router 330 for storage in a content storage volume 340 along with the associated fingerprint 417 as a storage object 440. Thus, the unique fingerprint 417 serves as a link between the information stored in the metadata database and the file content file stored in the content storage volume. In one embodiment of the present invention, fingerprint 417 is generated by first determining a separate segment fingerprint for each of segments A, B, C, D and E using a hashing computation and then combining or hashing those segment fingerprints values to result in fingerprint 417.

When file 420 is provided to deduplication server 140, metadata 422 is provided to the metadata database 325 along with fingerprint 427. Deduplication server 140 then checks to see if data associated with fingerprint 427 has already been stored in content storage volume 340. Since storage object 440 has already been provided to content storage volume 340, that data is not duplicated in the content storage volume. A similar process occurs for file 430 in which metadata 432 and the associated fingerprint 437 are stored in the metadata database but no duplication of data is made in content storage volume 340.

Figure 4B:
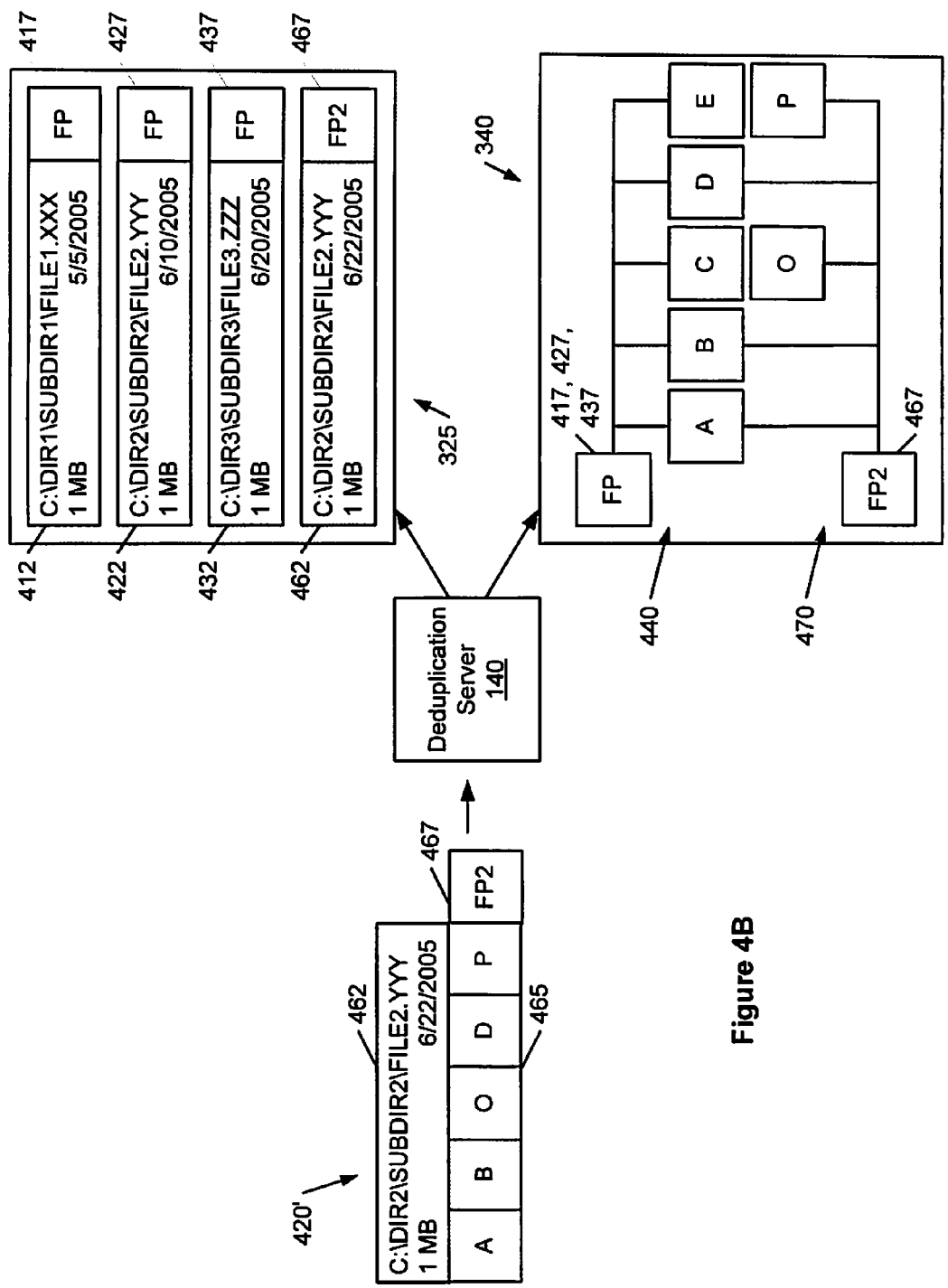
FIG. 4B is a simplified block diagram illustrating information stored in the event of a change of one of the files illustrated in FIG. 4A.

FIG. 4B is a simplified block diagram illustrating information stored in the event of a change of one of the files illustrated in FIG. 4A. FIG. 4B illustrates a change occurring in file 420 creating a file 420'. Metadata 462 associated with file 420' reflects a new modification date. Content 465 is illustrated showing that original segments C and E of file 420 have been changed to segments O and P, while the other segments remain the same. Since content 465 is different from original content 425, a different fingerprint 467 is generated.

When file 420' is provided to deduplication server 140, file metadata 462 is provided to metadata database 325 along with new fingerprint 467. Upon establishing that a storage object associated with fingerprint 467 has not been previously stored in content storage volume 340, file content 465 is provided to a content router associated with content storage volume 340. The content router can establish that of all the segments comprising file content 465, only segments O and P have yet to be stored in the content storage volume and fingerprint 467 is associated with the shared previously stored segments and the modified segment. One example of how a content router can determine whether a data segment has been previously stored is by maintaining checksums of each stored data segment and comparing a checksum of a data segment to be stored against those already stored. That association of fingerprint 467 and the previously stored and modified segments is stored as a storage object 470.

The above discussion illustrates a process of dividing a file into segments. Deduplication of data in a content storage volume by a content router is then carried out on a segment-by-segment basis. This allows for changes in part of a file to be reflected by storing only those segments that have been modified. Typically, a default segment size is chosen for a volume in a manner to optimize management of information and to increase the likelihood of duplicate segments. If the default segment size is too small then a deduplication server can be overwhelmed by having to manage metadata and data for a large number of segments. If the default segment size is too large, then the likelihood of duplicate segments is reduced. A typical default segment size is 128k bytes, but can be configured based upon applications being run by a client and types of data being stored by that client.

The above illustrations show the beginning of a file coinciding with the beginning of a segment. This is convenient for files that are approximately the size of a segment or larger, because it provides a well-defined starting point for data associated with the file. But if a new segment is started for each file that is smaller than a default segment size, then a significant amount of space can be lost on a content storage volume since the unused space at the end of the segment cannot be recovered. One solution is to modify segment size for these small files and to thereby have a segment size that is the same as the file size for those files. But, as mentioned above, in both cases in which one segment is associated with one file, then the deduplication server can be overwhelmed by having to manage a large number of segments (e.g., metadata and fingerprint information for each file and each segment).

Embodiments of the present invention address these issues by including multiple small files within a single defaults-sized segment.

FIG. 5A is an illustration of a simple directory structure. File directories and filenames are associated with labels $f_0$-$f_9$. Embodiments of the present invention hash (or checksum) each filename in the directory structure. All or part of the hash of the filename is compared to a predetermined boundary marker value (e.g., 0000). If the filename hash equals the boundary marker value, then the file associated with the filename hash begins a new group of files. Thus, the files in the directory tree are grouped from boundary marker to boundary marker. A beginning of a new segment is associated with the beginning of each group of files (i.e., the file associated with the boundary marker begins the new segment). If a "large" file is present in the directory tree (e.g., a file on the order of the size of a segment or larger), then the beginning of that file is associated with the beginning of a segment regardless of whether the filename hash of that file corresponds with a boundary marker. Embodiments of the present invention permit configuration of a threshold size for a "large" file, and thus when a segment will be begun in response to the presence of a "large" file.

FIG. 5B is a simplified block diagram illustrating a division of files from FIG. 5A among a set of data segments, in accord with embodiments of the present invention. Data segments A, B, C, D, E are illustrated. Data segment A includes files $f_0$, $f_1$ and $f_2$, wherein $f_0$ has a hashed filename corresponding to a boundary marker. File $f_3$ is a "large" file and begins segment B and continues into contiguous segment C. Segment C is resized to accommodate the remaining data of file $f_3$. File $f_4$ does not have a hashed filename corresponding to a boundary marker, but is a first small file after "large" file $f_3$, thus $f_4$ begins a next segment D that is further associated with files $f_5$ and $f_6$. In an alternative embodiment, files $F_4$, $f_5$ and $f_6$ are also included in a non-resized segment C, along with the remaining data of file $f_3$ since none of the files has a hashed filename corresponding to a boundary marker. Files $f_7$, $f_8$ and $f_9$ are associated with segment E and file $f_7$ has a hashed filename corresponding to the boundary marker.

Each of segments A-E can have an associated fingerprint, which, as discussed above, can be a hashing of the contents of the segment. Each segment can also have associated metadata describing the files that are included in the fingerprint. In addition, Segments A-E, as a group, can be associated with a unique set of group metadata and a fingerprint associated with the group of segments. Segments A-E can then be stored in a content storage volume as discussed above with regard to FIG. 4A.

An advantage of such a method of file grouping in data segments is that duplication of data segments is maintained even if a file is added to the directory structure. FIG. 5C illustrates the effect of adding a file to the directory structure of FIG. 5A. In the illustrated example, a file, file 10, is added to the directory\client1\directory1\subdir1 ($f_{10}$). As can be seen in FIG. 5C, only segment D has been changed by the addition of file $f_{10}$. Segment E remains unchanged because file $f_7$, as a file having a hashed filename corresponding to a boundary marker, begins the new segment E. Even if file $f_{10}$ had been a file large enough to cause D' to be larger than a single segment, the segment associated with file $f_7$ would remain unchanged since a new segment would begin with file $f_7$ and would have data that corresponds to the originally stored segment E.

Grouping files in this manner is effective especially in a scenario in which a deduplication server is associated with system backups. This is because a system backup process typically traverses a directory structure in the same manner each time a backup is performed. Thus, files $f_0$-$f_9$ will be traversed in the same manner each time the backup is performed, thereby creating a situation in which the same files will follow a file associated with a boundary marker and creating a greater likelihood of duplicate segments from backup to backup.

In one embodiment of the present invention, a process of allocating files to segments is executed by backup server 230 prior to sending the segments to deduplication server 240. In one aspect of this embodiment, a backup agent executes on a client 210 and collects file data destined for storage in a content storage volume of the deduplication server by traversing a directory tree of the client. The file data and information about the file data (e.g., file name and file size) is provided to backup server 230. Backup server 230 analyzes the information about the file data as that information is received from client 210 and assigns files to segments based upon the criteria discussed above (e.g., file size and hashed filename). Once a segment is full, backup server 230 can hash the segment to generate a corresponding segment fingerprint. The segment fingerprint is then provided to deduplication server 240 in order to determine whether a copy of that segment has already been stored in a content storage volume. If no copy of the segment has already been stored, then the segment, along with metadata about the segment (e.g., information related to the files stored in the segment) and the segment fingerprint are provided to the deduplication server for storage in a content storage volume. If a copy of the segment has previously been stored in a content storage volume, then the current segment is not sent to the deduplication server.

While the above-described embodiment provides for certain tasks being performed by one of a backup client, backup server and deduplication server, it should be noted that the present invention is not limited to dividing task responsibility to a specific node. For example, file-to-segment allocation tasks can be performed either by a backup agent executing on client 210 or by deduplication server 240 (or a specific module within deduplication server 240). An advantage of the above-described embodiment is that duplicate segments are not communicated on a network between backup server 230 and deduplication server 240.

Figure 6:
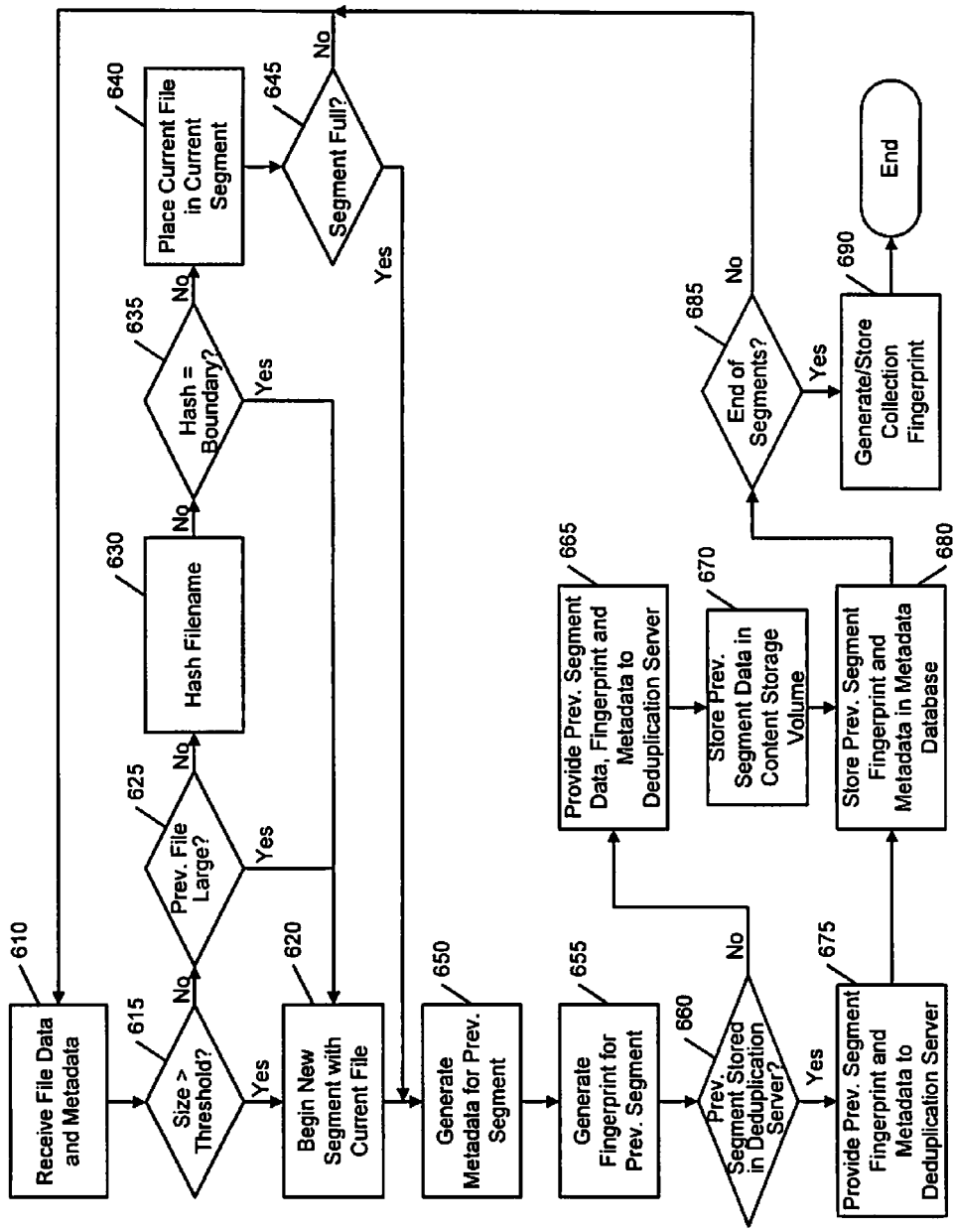
FIG. 6 is a simplified flow diagram illustrating a method for assigning files to a segment, in accord with embodiments of the present invention.

FIG. 6 is a simplified flow diagram illustrating a method for assigning files to segments, in accord with embodiments of the present invention. Files are identified or tagged to be stored in a single instance storage area (e.g., a content storage volume 340). As discussed above, this file identification can be performed, for example, by a backup agent executing on a client 210. File identification is performed, in part, by traversing a directory tree structure. File metadata, such as filenames and file size, is also collected during the process of file identification. The file data and file metadata are received for performing the segment generation and deduplication tasks (610).

For each file, the size-related metadata is examined to determine if the size of the associated file is greater than a set threshold size (615). The threshold size is set such that if a new segment is begun at the beginning of the file, that segment will be substantially full or the file will continue on to a subsequent segment (e.g., the file is on the order of the same size as a segment or greater). If a file meets or exceeds the threshold size, then the beginning of that file marks a boundary of a new segment (620).

If the file is smaller than the threshold size, then a determination is made as to whether the previous file was a "large" file (e.g., the size of the previous file was greater than the threshold size) (625). If the previous file was a "large" file, then a new segment is begun at the beginning of the corresponding current file (620).

If the file is smaller than the threshold size and the previous file was not a "large" file, then the filename associated with the file is hashed (630). As discussed above, the filename hashing can be performed using any suitable algorithm (e.g., checksum, CRC, MD5, and the like) upon a suitable section of the filename in order to ultimately perform a comparison between the hashed filename and a boundary marker. A determination is then made as to whether the hashed filename corresponds to a predetermined boundary marker value (635). The predetermined boundary marker value is set to a value that is likely to be generated through hashing of the filenames. If the hashed filename corresponds to the predetermined boundary marker value, then a new segment is begun at the beginning of the corresponding file (620).

If all determinations 615, 625 and 635 fail, then the current file is assigned to the current segment (640). After assigning the current file to the current segment, a determination is made as to whether the current segment is full (645). If not, then the analysis continues with the next received file (610) and the size threshold and boundary marker determinations are made on the next file.

Once a new segment is begun or a determination that a current segment is full, metadata for the previous segment is generated. This segment metadata includes information regarding the files contained within the segment (e.g., filenames, file sizes, offsets from beginning of the segment to a beginning of a file) (650). A segment fingerprint is also generated using, for example, a hashing or checksum of the segment (655).

Using the segment fingerprint, a determination is then made as to whether the corresponding segment data has already been stored in content storage of the deduplication server (660). In one embodiment of the present invention, such a determination is performed by transmitting the segment fingerprint to deduplication server 240 (or metadata database server 320). The deduplication server then performs a query to determine whether data having the segment fingerprint has previously been stored. The deduplication server then provides a result of that query.

If the segment data has not previously been stored by the deduplication server, then the segment data, segment fingerprint and segment metadata are provided to the deduplication server (665). The segment data is stored in the content storage volume and associated with the segment fingerprint (670). If the segment data has already been stored, then the data is not duplicated in the content storage volume, but the segment fingerprint and metadata are provided to the deduplication server (675). In both cases, the segment fingerprint and segment metadata are provided to metadata database server 320 for storage or tracking (680).

A determination is then made as to whether all the segments have been examined (685). If not, then the process returns to 610 and the process repeats. Once all segments have been reviewed for storage and stored if necessary, then a collection fingerprint of the collection of segments is generated (e.g., by hash or checksum of all the segment fingerprints) and stored by the metadata database server and associated with the set of segments (690). The process then terminates.

Embodiments of the present invention employing the above-described mechanism for including multiple files within a segment address the issue of wasted space in segments that contain only one small file and overhead issues related to managing many segments each containing only one small file. Furthermore, the mechanism of determining a segment boundary based upon a filename hash increases the likelihood of segment duplication from backup to backup. This is especially true if the number of files that changes between backups is relatively low. Such an occurrence will happen, for example, in operating system files and application files. Further, typically data storage volumes do not witness a large turnover in the overall number of files or the data within them changing from backup to backup.

By increasing the likelihood that segments will be duplicated from backup to backup, the amount of storage necessary to store subsequent backups in a single instance store is reduced because the duplicated segments will not be stored in a subsequent backup. Further benefits are realized from embodiments of the present invention if the process of determining the presence of duplicate segments is performed by a backup process executing on the client of the deduplication server (e.g., a backup server 230 or a client 210) prior to the content information being transferred over a network to the deduplication server. Such a process can require transfer of metadata information between the metadata database servers and the clients (e.g., fingerprint information), as described above. But by doing so, overall network bandwidth resources can be dramatically conserved.

An Example Computing And Network Environment

As shown above, the present invention can be implemented using a variety of computer systems and networks. An example of one such computing and network environment is described below with reference to FIGS. 7 and 8.

Figure 7:
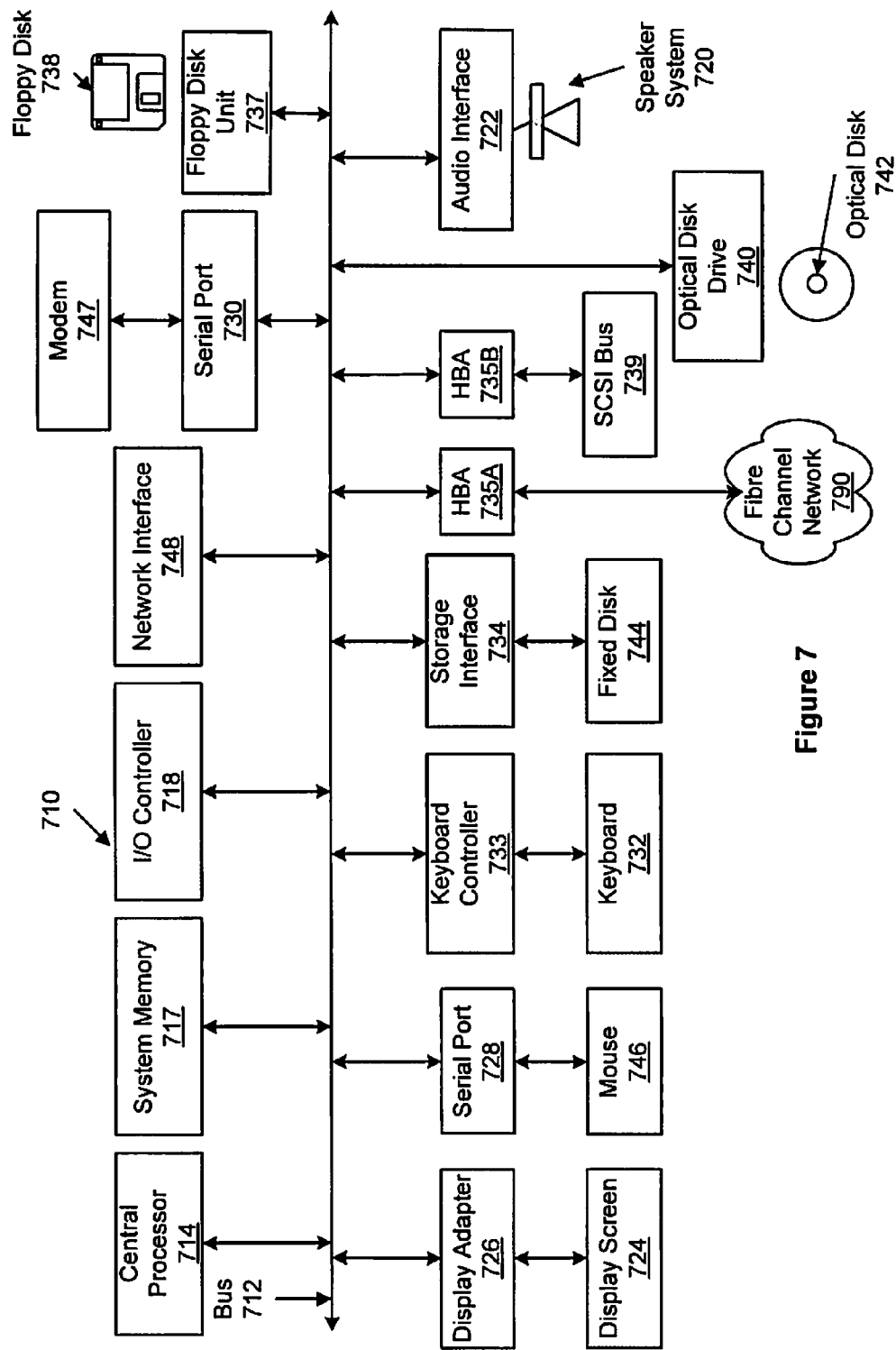
FIG. 7 depicts a block diagram of a computer system suitable for implementing aspects of the present invention.

FIG. 7 depicts a block diagram of a computer system 710 suitable for implementing aspects of the present invention (e.g., clients 210, backup server 230, and deduplication server 240). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
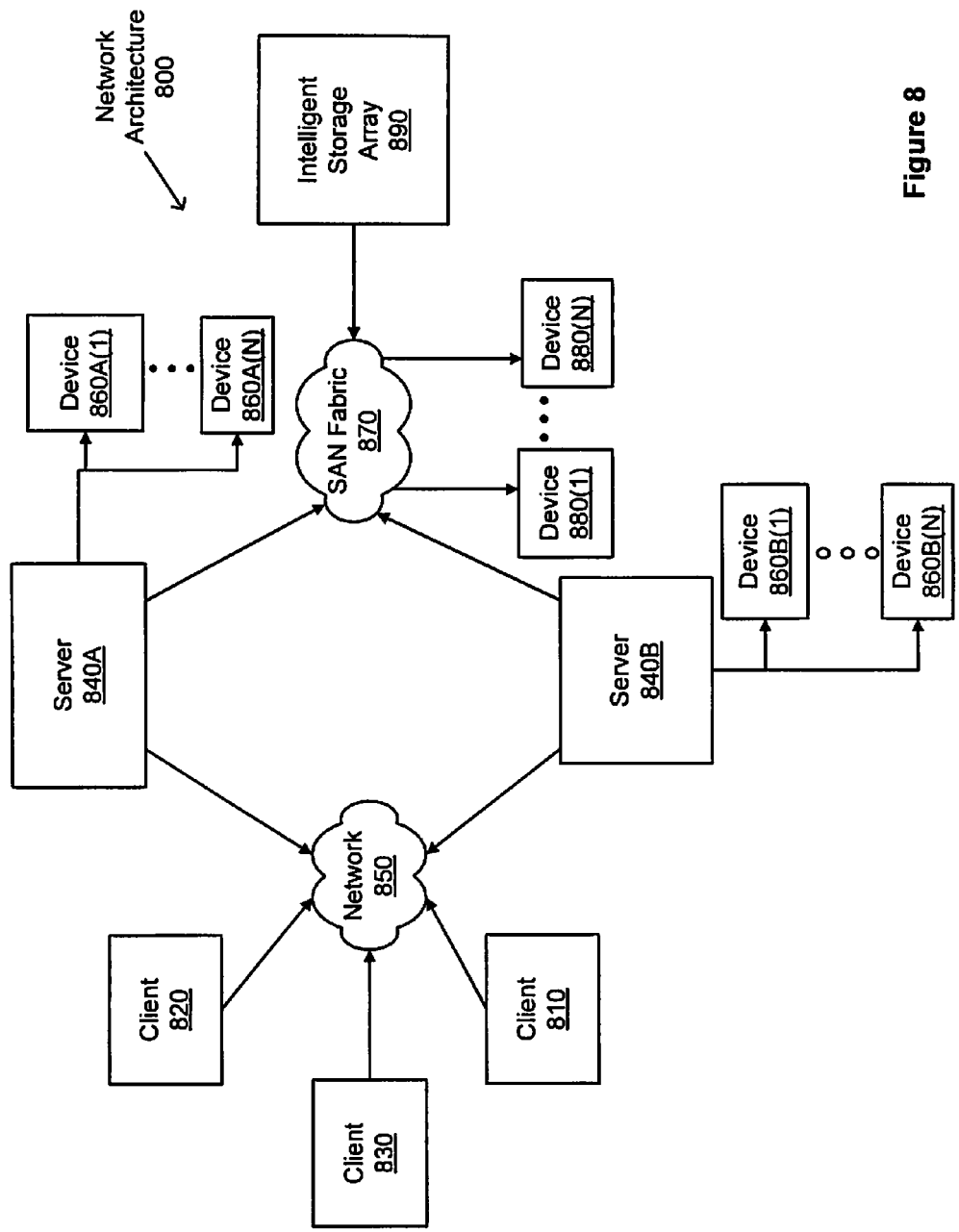
FIG. 8 is a block diagram depicting a network architecture suitable for implementing aspects of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    assigning a first file to one of a first data segment and a second data segment, wherein
        the assigning comprises
            comparing a size of the first file to a predetermined size threshold,
            assigning the first file to be a starting point for the second data segment, if the size of the first file is equal to or greater than the predetermined size threshold,
            generating a hashed file identifier by hashing a file identifier for the first file,
            assigning the first file to the first data segment, if the hashed file identifier is not equal to a predetermined boundary value, and and
            assigning the first file to start the second data segment, if the hashed file identifier is equal to the predetermined boundary value, and
        a second file is previously assigned to the first data segment; and
    providing the first and second data segments to a single instance storage volume.

2. The method of claim 1, further comprising:
    generating a segment fingerprint for the first data segment, wherein
        the segment fingerprint comprises a checksum for the first data segment;
    associating the segment fingerprint with the first data segment; and
    if another data segment has not previously been stored, storing the first data segment and the segment fingerprint in the single instance storage volume, wherein
        the another data segment is associated with a second segment fingerprint, and
        if the second segment fingerprint is not the same as the segment fingerprint, the another data segment has not previously been stored.

3. The method of claim 2, further comprising:
    associating segment metadata with the first data segment, wherein
        the segment metadata comprises
            a catalog of each file assigned to the first data segment.

4. The method of claim 3, further comprising:
    storing the segment metadata and the segment fingerprint in a metadata database associated with the single instance storage volume.

5. The method of claim 1, further comprising:
    providing a set of data segments to the single instance storage volume, wherein the set of data segments comprises the first and second data segments;
    generating a group fingerprint for the set of data segments, wherein
        the group fingerprint comprises a checksum for the set of data segments; and
    associating the group fingerprint with the set of data segments.

6. The method of claim 1, further comprising:
    comparing the first data segment with previously stored data segments in the single instance storage volume; and
    storing the first data segment in the single instance storage volume only if the comparing fails to identify a data segment having identical content previously stored in the single instance storage volume.

7. The method of claim 1, wherein
    the predetermined size threshold is configurable, and
    the predetermined size threshold represents a file size that is equal to or greater than the size of a data segment.

8. The method of claim 1, further comprising:
    determining the predetermined size threshold.

9. A system comprising:
    a backup server, the backup server comprising
        a first processor; and
        a first memory, coupled to the first processor, storing instructions executable by the first processor, the instructions configured to
            assign a first file to one of a first data segment and a second data segment, and
            provide the first data segment and the second data segment to a single instance storage volume, wherein
                the instructions configured to assign further comprise instructions configured to
                    compare a size of the first file to a predetermined size threshold,
                    assign the first file to be a starting point for the second data segment, if the size of the first file is equal to or greater than the predetermined size threshold,
                    generate a hashed file identifier by hashing a file identifier for the first file,
                    assign the first file to the first data segment, if the hashed file identifier is not equal to a predetermined boundary value, and
                    assign the first file to start the second data segment, if the hashed file identifier is equal to the predetermined boundary value,
                a second file is previously assigned to the first data segment.

10. The system of claim 9, further comprising:
    a deduplication server, wherein the first memory further storing instructions configured to
- generate a segment fingerprint for the first data segment, wherein
  - the segment fingerprint comprises
    - a checksum for the first data segment, and
- associate the segment fingerprint with the first data segment, the deduplication server is coupled to the backup server, and the deduplication server comprises
- a second processor,
- the single instance storage volume, wherein
  - the single instance storage volume is coupled to the second processor, and
- a second memory, coupled to the second processor, storing second instructions executable by the second processor, the second instructions configured to
  - store the first data segment and the segment fingerprint in the single instance storage volume, if another data segment has not previously been stored, wherein
    - the another data segment is associated with a second segment fingerprint, and
    - if the second segment fingerprint is not the same as the segment fingerprint, the another data segment has not previously been stored.

11. The system of claim 10, further comprising:
the first memory further storing instructions configured to
- associate segment metadata with the first data segment, wherein
  - the segment metadata comprises
    - a catalog of each file assigned to the first data segment.

12. The system of claim 11, wherein the deduplication server further comprises:
a metadata database, wherein
- the metadata database is associated with the single instance storage volume,
- the metadata database is accessible by the second processor, and
- the second memory further stores instructions configured to
  - store the segment metadata and the segment fingerprint in the metadata database.

13. The system of claim 9, further comprising:
a deduplication server, wherein
the deduplication server is coupled to the backup server, and
the deduplication server comprises
- a second processor,
- the single instance storage volume, wherein
  - the single instance storage volume is coupled to the second processor, and
- a second memory, coupled to the second processor, storing second instructions executable by the second processor, the second instructions configured to
  - compare the first data segment with previously stored data segments in the single instance storage volume and
  - store the first data segment in the single instance storage volume only if the comparing fails to identify a data segment having identical content previously stored in the single instance storage volume.

14. An apparatus comprising:
a processor;
a network interface configured to receive a first file and a second file;
means for assigning the first file to one of a first data segment and a second data segment, wherein
the means for assigning comprises
- means for comparing a size of the first file to a predetermined size threshold,
- means for assigning the first file to be a starting point for the second data segment, if the size of the first file is equal to or greater than the predetermined size threshold,
- means for generating a hashed file identifier by hashing a file identifier for the first file,
- means for assigning the first file to the first data segment, if the hashed file identifier is not equal to a predetermined boundary value, and
- means for assigning the first file to start the second data segment, if the hashed file identifier is equal to the predetermined boundary value, and
the second file is previously assigned to the first data segment; and
means for providing the first and second data segments to a single instance storage volume.

15. The apparatus of claim 14, further comprising:
the single instance storage volume, wherein
- the single instance storage is coupled to the processor; and
means for generating a segment fingerprint for the first data segment, wherein
- the segment fingerprint comprises
  - a checksum for the first data segment;
means for associating the segment fingerprint with the first data segment; and
means for storing, if another data segment has not previously been stored, the first data segment and the segment fingerprint in the single instance storage volume, wherein
- the another data segment is associated with a second segment fingerprint, and
- if the second segment fingerprint is not the same as the segment fingerprint, the another data segment has not previously been stored.

16. The apparatus of claim 15, further comprising:
means for associating segment metadata with the first data segment, wherein
- the segment metadata comprises
  - a catalog of each file assigned to the first data segment.

17. The apparatus of claim 16, further comprising:
a metadata database coupled to the processor; and
means for storing the segment metadata and the segment fingerprint in the metadata database.

18. The apparatus of claim 14, further comprising:
means for comparing the first data segment with previously stored data segments in the single instance storage volume; and
means for storing the first data segment in the single instance storage volume only if the comparing fails to identify a data segment having identical content previously stored in the single instance storage volume.

\* \* \* \* \*